United States Patent [19]
Miura

[11] Patent Number: 4,665,435
[45] Date of Patent: May 12, 1987

[54] METHOD AND CIRCUIT ARRANGEMENT FOR PRODUCING COLOR PICTURE SIGNALS FOR COLOR REPRODUCTION

[75] Inventor: Masayoshi Miura, Kawasaki, Japan

[73] Assignee: Matsushita Electric Industrial Co., Ltd., Osaka, Japan

[21] Appl. No.: 505,355

[22] Filed: Jun. 16, 1983

[51] Int. Cl.$^4$ .............................................. H04N 1/46
[52] U.S. Cl. ..................................................... 358/80
[58] Field of Search .......................................... 358/80

[56] References Cited

U.S. PATENT DOCUMENTS

| | | | |
|---|---|---|---|
| 3,600,505 | 8/1971 | Dobouney | 358/80 |
| 4,349,835 | 9/1982 | Horiguchi | 358/80 |
| 4,454,536 | 6/1984 | Shimura | 358/80 |
| 4,458,265 | 7/1984 | Yoshida | 358/80 |
| 4,463,373 | 7/1984 | Mikami | 358/80 |
| 4,481,532 | 11/1984 | Clark | 358/80 |

Primary Examiner—Michael A. Masinick
Attorney, Agent, or Firm—Lowe, King, Price & Becker

[57] ABSTRACT

Three primary color signals derived from an original color picture are processed to produce six or seven signals indicative of six or seven hues. These six or seven signals are then modified or corrected by a plurality of correction factors so as to produce three color picture signals which may be used for producing three driving signals respectively applied to three ink-jet print heads via which three primary color inks are applied to a print sheet. The correction factors may be manually adjusted so as to achieve accurate color reproduction by optimally controlling the amount of inks to be applied on the surface of the print sheet. In addition to the primary color inks a black ink may also be used where the amount of the black ink may also be controlled by using other correction factors. The present invention is applicable to not only an ink-jet color reproducing system but also to color printing systems of other types.

27 Claims, 8 Drawing Figures

METHOD AND CIRCUIT ARRANGEMENT FOR PRODUCING COLOR PICTURE SIGNALS FOR COLOR REPRODUCTION

BACKGROUND OF THE INVENTION

This invention relates generally to method and apparatus for producing color picture or color ink signals which are used in additive process of color reproduction by way of an ink-jet system, a color printing system or the like.

Color reproduction by way of an ink-jet system or a color printing system is effected such that three primary color inks, i.e. yellow, magenta and cyan inks, are respectively applied to a print sheet to be added to each other, while a black ink may also be added if desired. Namely, an original color of a picture or an image to be reproduced is first read by way of opto-electromechanical scanning to produce three primary color signals, and then the amount of three primary color inks is controlled in accordance with the ratio between these signals to paint or give color inks on a print sheet or the like. However, since currently available color inks are not ideal in connection with purity, color mixing control cannot be simply effected in accordance with the ratio between signals indicative of the original color. Describing in detail, yellow, magenta and cyan inks respectively include components of other colors, and therefore, these other color components result in impure or muddy color. Suppose a yellow component in the yellow ink, a magenta component in the magenta ink and cyan component in the cyan ink are respectively expressed in terms of 1, and other color components included in these primary color inks are expressed as follows.

magenta component in the yellow ink: $k_{21}$
cyan component in the yellow ink: $k_{31}$
cyan component in the magenta ink: $k_{32}$
yellow component in the magenta ink: $k_{12}$
yellow component in the cyan ink: $K_{13}$
magenta component in the cyan ink: $k_{23}$ In the above, the occurrence of impure or turbid colors cannot be avoided unless the value of the above components $k_{12}, k_{13}, k_{23}, k_{21}, k_{31}$ and $k_{32}$ is zero. Assuming that yellow, magenta and cyan components of a mixed color obtained as the result of color reproduction are expressed in terms of Yi, Mi and Ci, these components Yi, Mi and Ci can be given by:

$$Yi = Y_0 + k_{12}M_0 + k_{12}C_0$$
$$Mi = k_{21}Y_0 + M_0 + k_{23}C_0 \quad (1)$$
$$Ci = k_{31}Y_0 + k_{32}M_0 + C_0$$

wherein $Y_0$, $M_0$ and $C_0$ are the amounts of yellow, magenta and cyan inks to be applied and mixed; and it is assumed that an additive process is effected such that each color ink is mixed in proportion to the amount thereof.

The above formulas (1) are correct only when each color is simply mixed in proportion to the amount of the corresponding color ink, and represents the degree of color impurity, or impureness.

Since such color impureness caused by impure or turbid color components is undesirable, correction or compensation has to be effected. Up to this time, the above formulas (1) have been used to effect correction or compensation of impure colors. Namely, the values of $Y_0$, $M_0$ and $C_0$ are respectively selected so as to satisfy the following formula (2).

$$\begin{pmatrix} Y_0 \\ M_0 \\ C_0 \end{pmatrix} = \begin{pmatrix} 1 & K_{12} & K_{13} \\ K_{21} & 1 & K_{23} \\ K_{31} & K_{32} & 1 \end{pmatrix} \begin{pmatrix} Yi \\ Mi \\ Ci \end{pmatrix} \quad (2)$$

Although the above-mentioned conventional way of color correction in additive process is theoretically correct, it is not necessarily ideal in actual color printing or ink-jet color reproduction because each primary color ink does not mix with each other in proportion to its amount. In other words, the additivity rule is not valid. Especially in ink-jet color reproduction, it is difficult to mix each primary color ink with the others in proportion to its amount because of the following reasons. In order to ensure quick drying, a water-soluble ink is usually used, and such water-soulble ink is readily absorbed into a print sheet. As a result, the three primary color inks are difficult to mix with each other. In the case that the amount of three primary color inks applied on a print sheet is small, an additive process does not takes place satisfactorily. Furthermore, in order to ensure quick drying a sheet of paper having high absorbing power is often used. For these reasons, inks applied on the surface of a printing sheet are prevented from being mixed in an ideal manner. Generally speaking, a mixed color from two or three colors exhibits three primary color components whose values are lower than those derived from formula (1).

SUMMARY OF THE INVENTION

The present invention has been developed in order to remove the above-described drawbacks inherent to the conventional method and apparatus for effecting color reproduction for use with a color printing or an ink-jet color reproducing system.

It is, therefore, an object of the present invention to provide new and useful method and apparatus with which color reproduction is ideally effected so as to actualize accurate color reproduction.

According to a feature of the present invention three primary color signals derived from an original picture or the like are processed to produce seven hue signals. Then color picture or color ink signals are produced on the basis of these seven hue signals. If desired, another color ink signals for a black ink may also be produced in a similar manner. These color picture or color ink signals respectively represent the amount of corresponding color inks, and therefore, when the present invention is adapted to an ink-jet color reproducing system, these color picture or color ink signals may be used as driving signals or to produce such driving signals with which ink-jet print heads are respectively controlled.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
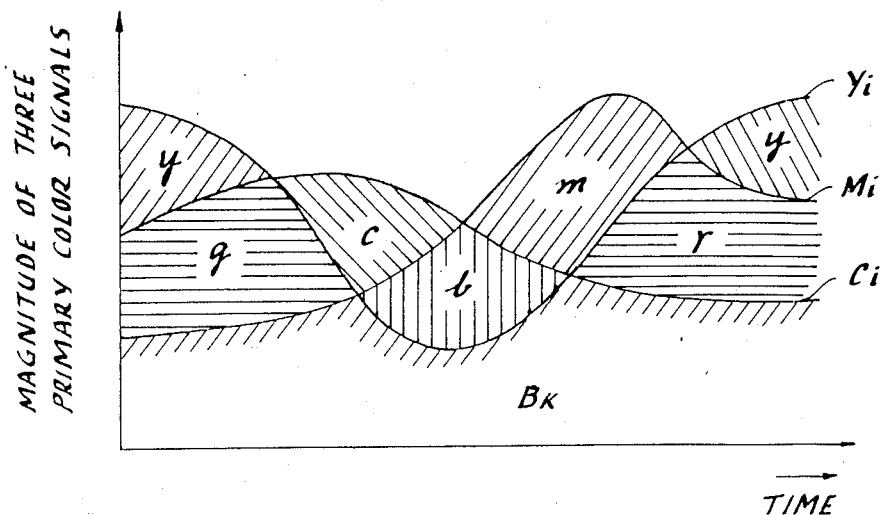
FIG. 1 is an explanatory diagram showing a method of providing seven hues by an additive process in which three primary color inks are mixed with each other.

FIG. 1 shows the way of providing seven hues by using three primary color signals which may be obtained by reading a point on an original color picture. Three signals respectively indicative of the three primary colors, i.e. yellow, magenta and cyan, are expressed in terms of Yi, Mi and Ci. When the magnitude of these signals Yi, Mi and Ci change as shown in FIG. 1, seven regions Bk, "r", "g", "b", "y", "m" and "c" are provided.

The region Bk is a portion where the signals Yi, Mi and Ci are superimposed, and corresponds to black when expressed in hue. The region "r" is a portion where the signals Yi and Mi are superimposed after subtracting the region Bk, and corresponds to a hue of red. The region "g" is a portion where the signals Ci and Yi are superimposed after subtracting the region Bk, and corresponds to a hue of green. The region "b" is a portion where the signals Mi and Ci are superimposed after subtracting the region Bk, and corresponds to a hue of blue. The region "y" is a portion where the signal Yi is present after subtracting the regions Bk, "g" and "r", and corresponds to a hue of yellow. The region "m" is a portion where the signal Mi is present after subtracting the regions Bk, "r" and "b", and corresponds to a hue of magenta. The region "c" is a portion where the signal Ci is present after subtracting the regions Bk, "b" and "g", and corresponds to a hue of cyan.

The above may be expressed by way of formulas as follows:

$$\left.\begin{array}{l} Bk = Min\ (Yi,\ Mi,\ Ci) \\ r = Min\ (Yi,\ Mi) - Bk \\ g = Min\ (Yi,\ Ci) - Bk \\ b = Min\ (Ci,\ Mi) - Bk \\ y = Yi - g - r - Bk \\ m = Mi - r - b - Bk \\ c = Ci - b - g - Bk \end{array}\right\} \quad (3)$$

wherein Min is a function assuming the smallest of the values of the signals enclosed in the following parentheses.

According to the present invention the amount of the three primary color inks and a black ink in some cases is controlled on the basis of three signals Bk, "r", "g", "b", "y", "m" and "c". These signals may be produced by a computer programmed to compute formulas (3). However, analog circuits may also be used to produce these signals as follows.

Figure 2:
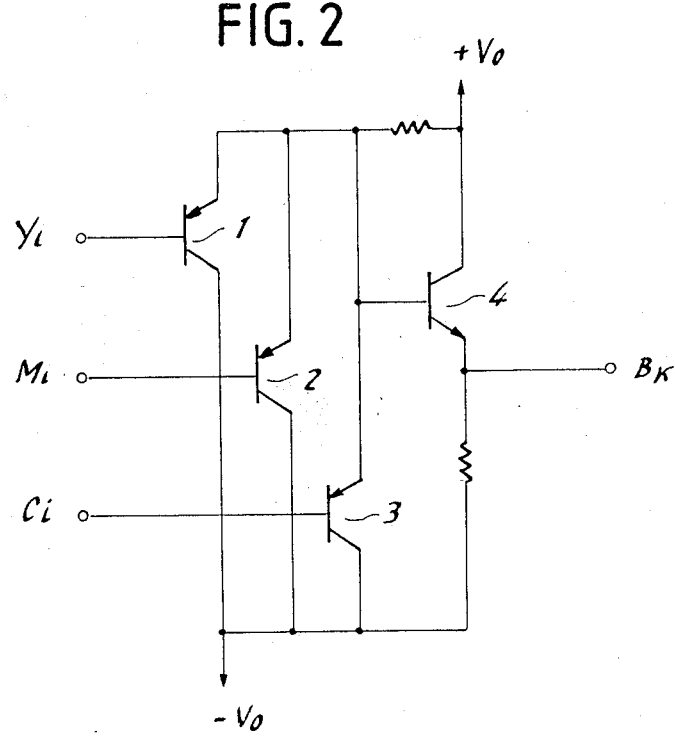
FIG. 2 is a diagram of a circuit for producing a signal indicative of a black component which will be used to produce color picture signals according to the present invention.
Figure 3:
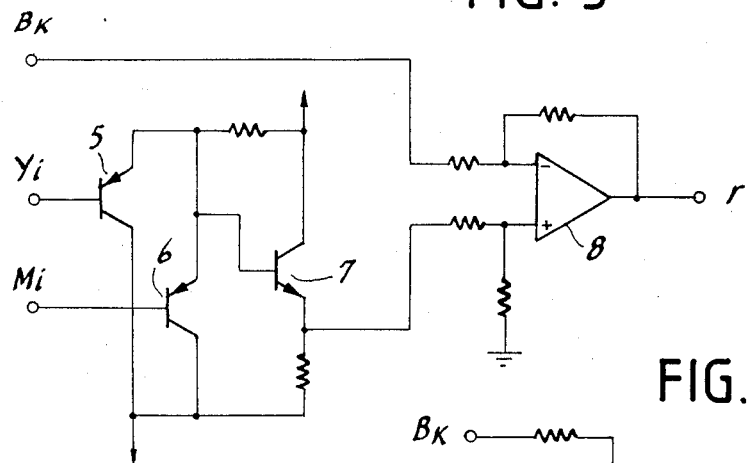
FIG. 3 is a diagram of a circuit for producing a signal indicative of a red component which will be used to produce color picture signals according to the present invention.
Figure 4:
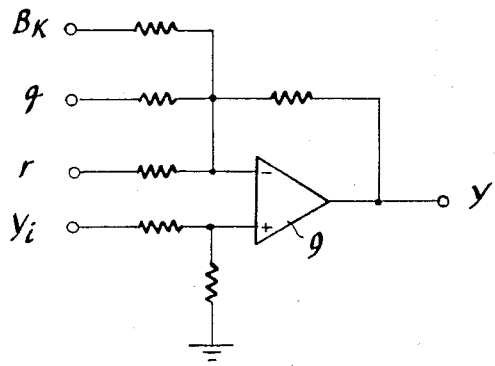
FIG. 4 is a diagram of a circuit for producing a signal indicative of a yellow component which will be used to produce color picture signals according to the present invention.

Various circuit arrangements may be available for producing these signals, Bk, "r", "g" . . . , and several examples thereof are shown as embodiments of the present invention in FIGS. 2 through 4.

FIG. 2 is a diagram of a circuit for producing the signal Bk. This circuit comprises four transistors 1, 2, 3 and 4, and two resistors (no numeral). The primary color signals Yi, Mi and Ci are respectively applied to bases of the transistors 1, 2 and 3, and output signals from emitters of these transistors 1, 2 and 3 are fed to the base of the transistor 4. As a result, the transistor 4 produces an output signal at its emitter, which output signal reprsents Bk=Min (Yi, Mi Ci). In FIG. 2, the references $+V_0$ and $-V_0$ are bias voltages. The circuit of FIG. 2 operates as a signal selector because one of the three input signals Yi, Mi and Ci is selected such that one having the smallest value is selected.

The primary color signals Yi, Mi and Ci applied to the circuit of FIG. 2 may be produced by various conventional circuit arrangements which read and scan an original picture to be reproduced. One example of such a method for producing the three primary color signals is disclosed in "PRINT MAGAZINE" Pages 3–13 of Vol. 60, published in 1977. However, such primary color signals may also be derived from a color television signal or a color signal produced in a computer.

FIG. 3 shows a diagram of a circuit for producing the signal "r". This circuit comprises three transistors 5, 6 and 7, a differential circuit 8 and six resistors (no numeral). The transistors 5 and 6 are responsive to the primary color signals Yi and Mi so that a signal indicative of Min (Yi, Mi) is derived from the emitter of the transistor 5 in the same manner as in FIG. 2. This signal Min (Yi, Mi) is fed to a noninverting input terminal (+) of the differential circuit 8 having an inverting input terminal (−) responsive to the signal Bk. Thus the differential circuit 8 produces a signal Min (Yi, Mi)−Bk as its output signal. The circuit of FIG. 3 operates as a combination of signal selector and an adder. The circuit arrangement of FIG. 3 may also be used to produce the signals "g" and "b" as will be understood from the formulas (3).

FIG. 4 shows a circuit arrangement for producing the signal "y". This circuit comprises a differential circuit 9 and six resistors (no numeral). The primary color signal Yi is fed to a noninverting input terminal (+) of the differential circuit 9, while an inverting input terminal (−) thereof is responsive to the signals Bk, "g" and "r".

As a result, the differential circuit 9 produces a signal $y = Y_i - g - r - Bk$ as its output signal. Namely, the circuit of FIG. 4 operates as an adder.

In the present invention, the above-described seven signals Bk, "r", "g", "b", "y", "m" and "c" are modified in a particular manner so as to produce three signals $Y_0$, $M_0$ and $C_0$. The references $Y_0$, $M_0$ and $C_0$ also represent the amount of the three primary color inks to be applied on a printing sheet. In the case of an ink-jet system, the signals $Y_0$, $M_0$, and $C_0$ respectively represent the magnitude of each driving signal applied to each print head.

Describing the present invention in further detail, the above signals $Y_0$, $M_0$ and $C_0$, indicative of the amount of three primary color inks, are respectively selected so as to satisfy the following formula:

$$\begin{pmatrix} Y_0 \\ M_0 \\ C_0 \end{pmatrix} = \begin{pmatrix} \alpha_1 \alpha_2 \alpha_3 \alpha_4 \alpha_5 \alpha_6 \alpha_7 \\ \beta_1 \beta_2 \beta_3 \beta_4 \beta_5 \beta_6 \beta_7 \\ \gamma_1 \gamma_2 \gamma_3 \gamma_4 \gamma_5 \gamma_6 \gamma_7 \end{pmatrix} \begin{pmatrix} y \\ m \\ c \\ r \\ g \\ b \\ Bk \end{pmatrix} \quad (4)$$

In the above formula, when $$\begin{pmatrix} \alpha_1 \alpha_2 \alpha_3 \alpha_4 \alpha_5 \alpha_6 \alpha_7 \\ \beta_1 \beta_2 \beta_3 \beta_4 \beta_5 \beta_6 \beta_7 \\ \gamma_1 \gamma_2 \gamma_3 \gamma_4 \gamma_5 \gamma_6 \gamma_7 \end{pmatrix} = \begin{pmatrix} 1 0 0 1 1 0 1 \\ 0 1 0 1 0 1 1 \\ 0 0 1 0 1 1 1 \end{pmatrix},$$

$Y_0 = Y_i$, $M_0 = M_i$ and $C_0 = C_i$. This means no color modification or correction is effected under this condition.

The above-shown references $\alpha_1, \alpha_2, \alpha_3 \ldots \beta_1, \beta_2, \beta_3 \ldots$ and $\gamma_1, \gamma_2, \gamma_3 \ldots$ are referred to as correction factors, and their functions will be described hereafter.

Correction factors $\alpha_1$, $\beta_1$ and $\gamma_1$ are used to correct the amount of the three primary color inks or the above-mentioned driving signals in an ink-jet color reproduction system when the hue of the original picture is yellow.

Correction factors $\alpha_2$, $\beta_2$ and $\gamma_2$ are used to correct the amount of the three primary color inks or the above-mentioned driving signals in an ink-jet color reproduction system when the hue of the original picture is magenta.

Correction factors $\alpha_3$, $\beta_3$ and $\gamma_3$ are used to correct the amount of the three primary color inks or the above-mentioned driving signals in an ink-jet color reproduction system when the hue of the original picture is cyan.

Correction factors $\alpha_4$, $\beta_4$ and $\gamma_4$ are used to correct the amount of the three primary color inks or the above-mentioned driving signals in an ink-jet color reproduction system when the hue of the original picture is red.

Correction factors $\alpha_5$, $\beta_5$ and $\gamma_5$ are used to correct the amount of the three primary color inks or the above-mentioned driving signals in an ink-jet color reproduction system when the hue of the original picture is green.

Correction factors $\alpha_6$, $\beta_6$ and $\gamma_6$ are used to correct the amount of the three primary color inks or the above-mentioned driving signals in an ink-jet color reproduction system when the hue of the original picture is blue.

Correction factors $\alpha_7$, $\beta_7$ and $\gamma_7$ are used to correct the amount of the three primary color inks or the above-mentioned driving signals in an ink-jet color reproduction system when the hue of the original picture is black.

Since these correction factors $\alpha_1$ to $\alpha_7$, $\beta_1$ to $\beta_7$ and $\gamma_1$ to $\gamma_7$ assume either 1 or 0 when no correction or modification is to be made with respect to the amount of the ink or to the driving signals fed to ink-jet print heads, the value of each of these correction factors indicates the degree of correction. For instance, in the case that the hue of the original picture is yellow and when it is intended to increase the amount of the yellow ink to twice the amount of the same used when no correction is made, the value of the correction factor $\alpha_1$ is set to 2. Remaining correction factors may also be controlled in the same manner. By controlling the values of these correction factors $\alpha_1$ to $\alpha_7$, $\beta_1$ to $\beta_7$ and $\gamma_1$ to $\gamma_7$ it is possible to provide accurate color reproduction.

Figure 5:
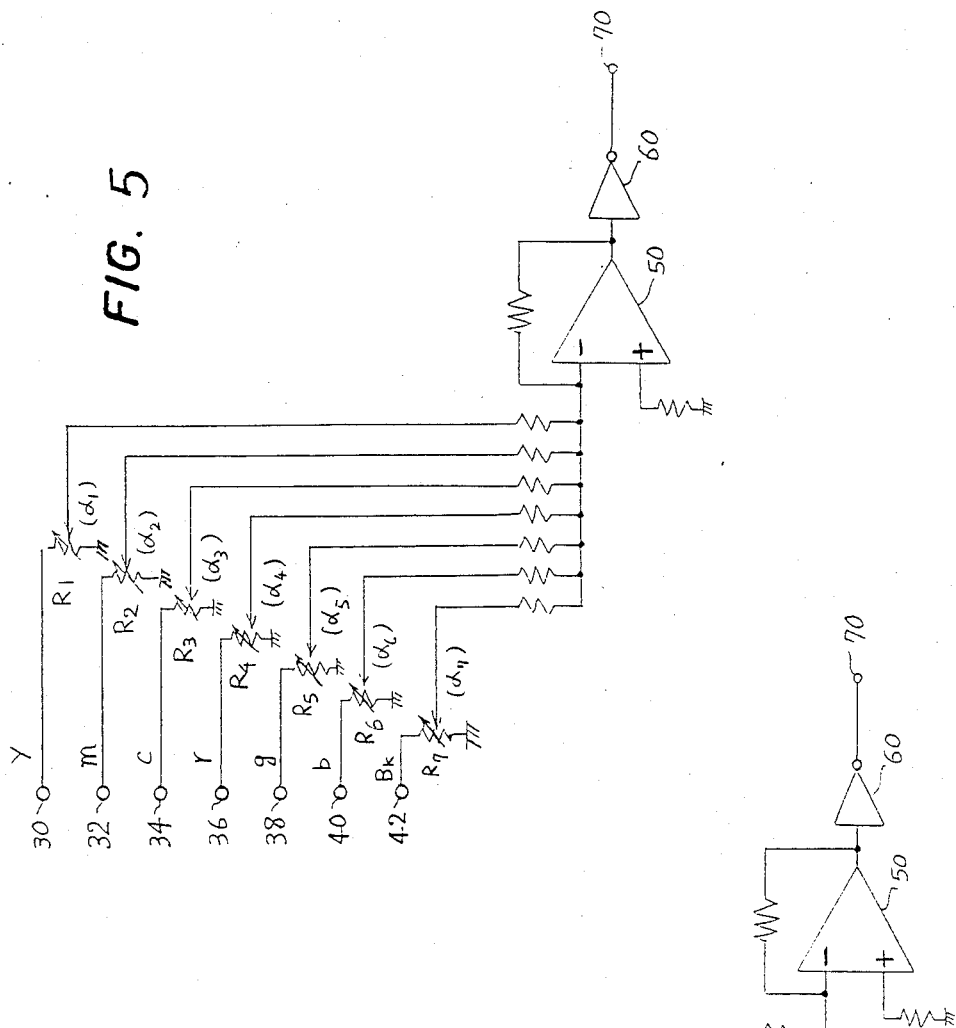
FIG. 5 is a diagram of a circuit for producing one of three color picture signals which respectively control the amount of three primary color inks in accordance with formula (4) described later.

FIG. 5 illustrates a circuit arrangement for determining the amount of each primary color ink. Namely, in the case of an ink-jet printing or color reproducing system, the circuit of FIG. 5 is used to produce the above-mentioned driving signal. The illustrated circuit arrangement is shown as one used for producing the driving signal $Y_0$ on the basis of the above-mentioned signals Bk "r", "g", "b", "y", "m", and "c". The remaining driving signals $M_0$ and $C_0$ may also be produced by circuit arrangements identical to that of FIG. 5, and therefore these circuits are not shown.

The circuit of FIG. 5 comprises seven input terminals 30 to 42, seven variable resistors $R_1$ to $R_7$, an operational amplifier 50, an inverter 60 and nine fixed resistors (no numeral). The operational amplifier 50 has a noninverting input terminal (+) grounded via a fixed resistor, and an inverting input terminal (−) connected via the resistors to the input terminals 30 to 42 respectively as shown. An output terminal of the operational amplifier 50 is connected via the inverter 60 to the ouput terminal 70. The circuit arrangement of FIG. 5 functions as an adder so that seven input components "y", "m", "c", "r", "g" "b" and Bk are added to each other with their magnitudes being adjusted according to the correction factors $\alpha_1$ to $\alpha_7$ which are represented by the resistances of the variable resistors $R_1$ to $R_7$. The variable resistors $R_1$ to $R_7$ may be manually adjusted so as to select desirable correction factors. Although FIG. 5 illustrates a circuit arrangement for producing the driving signal $Y_0$, the circuit arrangment may also be applied to other circuits which respectively produce remaining driving signals $M_0$ and $C_0$.

The feature of the present invention resides in the fact that the correction factors are independent from each other with respect to seven hues. Therefore, any hue may be modified or corrected without affecting other hues. Since each hue (yellow, magenta, cyan, red, green, blue and black) can be respectively controlled in an independent manner, it is possible to correct each hue throughout its entire range.

Since the correction factors $\alpha_1$ to $\alpha_7$, $\beta_1$ to $\beta_7$ and $\gamma_1$ to $\gamma_7$ respectively correspond to colors which can be visually recognized, these correction factors may be readily selected and adjusted by watching a printed or reproduced picture when the present invention is adapted to ink-jet color reproduction, color printing or the like.

The correction factors $\alpha_1$ to $\alpha_3$, $\beta_1$ to $\beta_3$ and $\gamma_1$ to $\gamma_3$ are color correction factors relating to hues of yellow, magenta and cyan, and when the values of correction factors other than these are fixed, the color modification does not effect more than that achieved by formula (2).

The correction factors $\alpha_4$ to $\alpha_6$, $\beta_4$ to $\beta_6$ and $\gamma_4$ to $\gamma_6$ are color correction factors relating to hues of red, green and blue, and these correction factors are used to modify the range of hue which can be actualized by mixing two different color inks. When these correction factors are added to the above-mentioned correction factors $\alpha_1$ to $\alpha_3$, $\beta_1$ to $\beta_3$ and $\gamma_1$ to $\gamma_3$, the range of hue modification can be remarkably widened. Correction factors $\alpha_7$, $\beta_7$ and $\gamma_7$ are related to black, and are used to modify thne range of hue which can be actualized by mixing three different color inks. These correction factors may be unnecessary when color balancing characteristic between yellow, magenta and cyan is ideal, i.e. when the characteristic of providing black is superior, or when the hue range of black can be reproduced by using a black ink. Namely, under such condition the correction factors $\alpha_7$, $\beta_7$ and $\gamma_7$ can be fixed to 1. However, these correction factors $\alpha_7$, $\beta_7$ and $\gamma_7$ are useful for modifying turbid colors such as brown or sepia when the above methods are not available.

In the case of applying a black ink, Bk of formula (3) has been used as it is or Bk has been used after processing the same as $K_1 \cdot Bk - K_2$ in conventional techniques. However, the amount of black ink cannot be controlled in accordance with hues with such conventional techniques. In order to control the amount of a black ink in such a manner, the amount of the black ink is preferably controlled according to the following formula (5):

$$Bk_0 = \delta_1 y + \delta_2 m + \delta_3 c + \delta_4 r + \delta_5 g + \delta_6 b + \delta_7 Bk \quad (5)$$

wherein $Bk_0$ is the amount of the black ink or the magnitude of a print head driving signal in an ink-jet printing system; and $\delta_1$ though $\delta_7$ are color correction factors for respective hues "y", "m", "c", "r", "g", "b" and Bk. The above formula (5) shows that the amount of the black ink can be adjusted with respect to seven hues, and therefore a desirable black printer can be provided. The driving signal $Bk_0$ determined in this way may be applied to a print head which is provided in addition to three primary color print heads. The driving signal $Bk_0$ may also be produced in the same circuit arrangement as that shown in FIG. 5. Namely, when the correction factors $\alpha_1$ to $\alpha_7$ in FIG. 5 are changed to other correction factors $\delta_1$ to $\delta_7$ of formula (5), the circuit of FIG. 5 may also be used to produce the driving signal $Bk_0$.

Now another embodiment of the present invention will be described. This embodiment utilizes the aforementioned formula (3) in such a manner that Bk, "r", "g", "b", "y", "m" and "c" of formula 3) are used as correction signals. In this embodiment, the amount of three primary color inks $Y_0$, $M_0$ and $C_0$ are determined by:

$$\begin{pmatrix} Y_0 \\ M_0 \\ C_0 \end{pmatrix} = \begin{pmatrix} Yi\ \alpha'_1\ \alpha'_2\ \alpha'_3\ \alpha'_4\ \alpha'_5\ \alpha'_6\ \alpha'_7 \\ Mi\ \beta'_1\ \beta'_2\ \beta'_3\ \beta'_4\ \beta'_5\ \beta'_6\ \beta'_7 \\ Ci\ \gamma'_1\ \gamma'_2\ \gamma'_3\ \gamma'_4\ \gamma'_5\ \gamma'_6\ \gamma'_7 \end{pmatrix} \begin{pmatrix} 1 \\ y \\ m \\ c \\ r \\ g \\ b \\ Bk \end{pmatrix} \quad (6)$$

The above formula (6) has a feature in that the signals "y", "m", "c", "r", "g", "b" and Bk are used as correction signals, and the effect resultiing from formula (6) is the same as that from formula (4).

Namely, since the following relationships are satisfied, $$Yi = y + r + g + Bk$$

$$Mi = m + b + r + Bk$$

$$Ci = c + g + b + Bk$$

formula (6) can be derived from formula (4) when the coefficients are written as:

$$\begin{pmatrix} \alpha_1 = 1 + \alpha'_1 \\ \alpha_2 = \alpha'_2 \\ \alpha_3 = \alpha'_3 \\ \alpha_4 = 1 + \alpha'_4 \\ \alpha_5 = 1 + \alpha'_5 \\ \alpha_6 = \alpha'_6 \\ \alpha_7 = 1 + \alpha'_7 \end{pmatrix} \begin{pmatrix} \beta_1 = \beta'_1 \\ \beta_2 = 1 + \beta'_2 \\ \beta_3 = \beta'_3 \\ \beta_4 = 1 + \beta'_4 \\ \beta_5 = \beta'_5 \\ \beta_6 = 1 + \beta'_6 \\ \beta_7 = 1 + \beta'_7 \end{pmatrix} \begin{pmatrix} \gamma_1 = \gamma'_1 \\ \gamma_2 = \gamma'_2 \\ \gamma_3 = 1 + \gamma'_3 \\ \gamma_4 = \gamma'_4 \\ \gamma_5 = 1 + \gamma'_5 \\ \gamma_6 = 1 + \gamma'_6 \\ \gamma_7 = 1 + \gamma'_7 \end{pmatrix}$$

The above-shown formula (6) may be operated by a circuit arrangement similar to that of FIG. 5. Namely, a circuit arrangement shown in FIG. 6 may be used. This circuit differs from that of FIG. 5 in that an input terminal 44 for receiving the primary color signal Yi is additionally provided. This input terminal 44 is connected via a resistor to the inverting input terminal (−) of the operational amplifier 50. The illustrated circuit is used for producing a driving signal $Y_0$ by modifying the primary color signal Yi, but identical circuit arrangements may also be used for other circuits for producing the remaining driving signals $M_0$ and $C_0$. Furthermore, when it is intended to provide a black ink print head in addition to the three primary color ink print heads, a circuit similar to that of FIG. 5 may also be added in the same manner as in the above-described first embodiment.

The circuit arrangements of FIG. 5 and 6 may be used when the value of each corresponding correction factor is in the following relationships:

$$0 \leq \alpha \leq 1, 0 \leq \beta \leq 1,$$

$$0 \leq \gamma \leq 1, 0 \leq \delta \leq 1,$$

Figure 6:
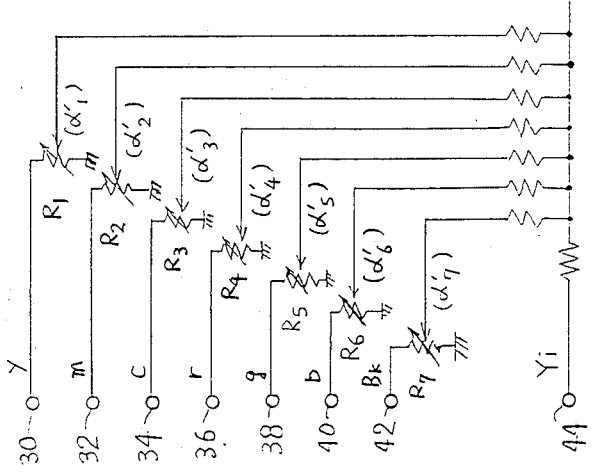
FIG. 6 is a diagram of a circuit for producing one of three color picture signals which respectively control the amount of three primary color inks in accordance with formula (6) described later.
Figure 7:
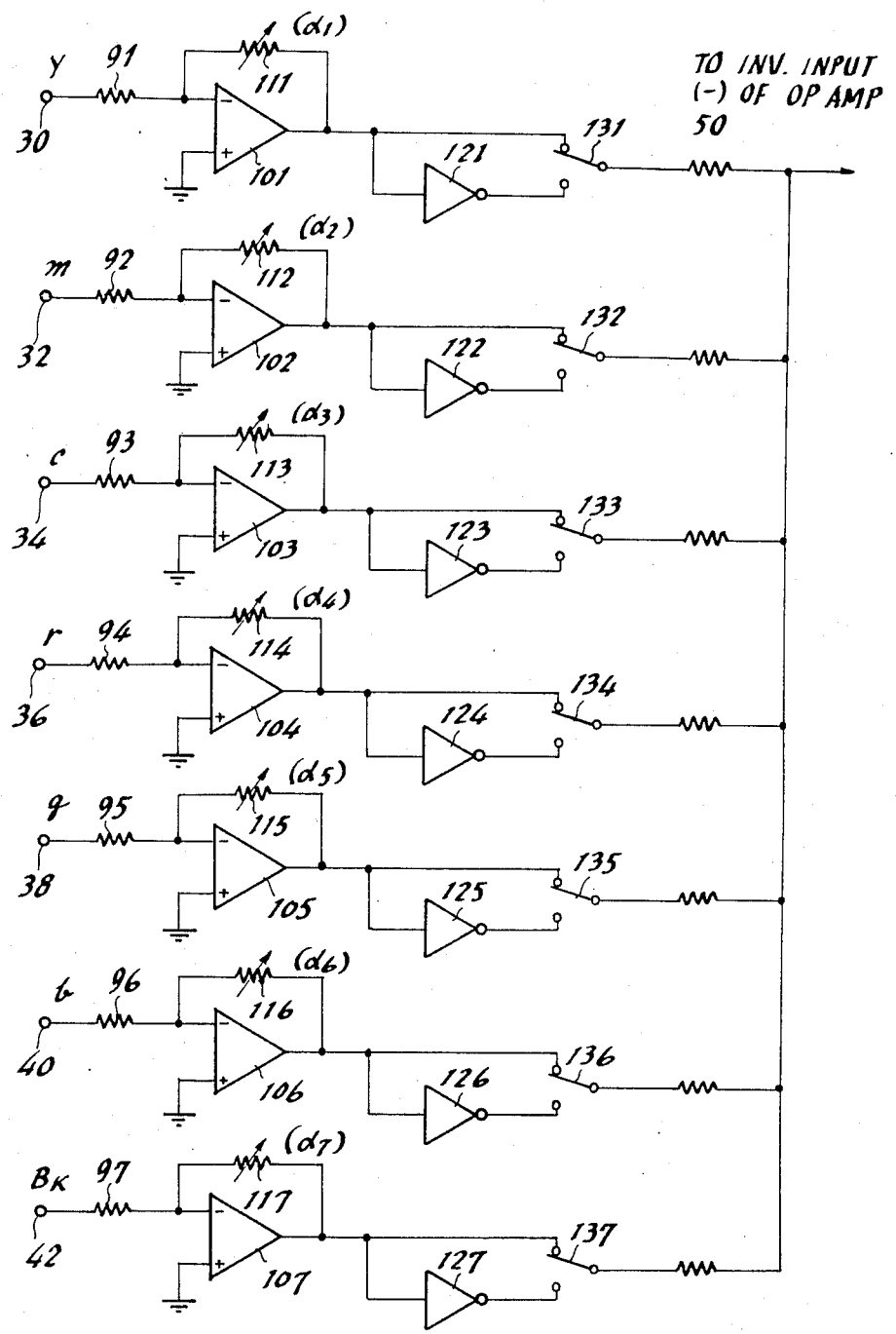
FIG. 7 is a diagram of a circuit which may be used in place of each of the variable resistors of FIGS. 5 and 6 in the case that a corresponding correction factor is either greater than 1 or smaller than 0.

Therefore, when it is intended to set one or more correction factors to a negative value or to a value greater than 1, a circuit arrangement shown in FIG. 7 is used as an input circuit in place of the variable resistors $R_1$ to $R_7$ of FIG. 5 or FIG. 6. The input circuit of FIG. 7 comprises seven input resistors 91 to 97, seven operational amplifiers 101 to 107, seven variable resistors 111 to 117, seven inverters 121 to 127, and seven switches 131 to 137. The switches 131 to 137 are used to select positive or negative values for each correction factors. Namely, when any switch is changed over to a side N, a negative correction factor will be set, and on the other hand when any switch is changed over to a the other side P, a positive correction factor will be set. In the case that one or some particular correction factors always assume positive or negative values, such switchs may be omitted. Namely, in the case that a correction factor always assumes a negative value, the inverter 121—and the switch 131—are unnecessary, and on the contrary in the case that a correction factor always assumes a positive value, the inverter 121—and the switch 131—are also unnecessary with the inverting input terminal (−) and the noninverting input terminal (+) of the operational amplifier 101—being exchanged.

It is possible to eliminate the correction factors $\alpha_7'$, $\beta_7'$, $\gamma_7'$ and Bk from the formula (6). Namely, the following formula (7) is available for correcting color components, too.

$$\begin{pmatrix} Y_0 \\ M_0 \\ C_0 \end{pmatrix} = \begin{pmatrix} Yi\ \alpha'_1\ \alpha'_2\ \alpha'_3\ \alpha'_4\ \alpha'_5\ \alpha'_6 \\ Mi\ \beta'_1\ \beta'_2\ \beta'_3\ \beta'_4\ \beta'_5\ \beta'_6 \\ Ci\ \gamma'_1\ \gamma'_2\ \gamma'_3\ \gamma'_4\ \gamma'_5\ \gamma'_6 \end{pmatrix} \begin{pmatrix} l \\ y \\ m \\ c \\ r \\ g \\ b \end{pmatrix} \quad (7)$$

The above formula (7) does not correct Bk component, but r, g and b components. Although the black component Bk is not corrected when the formula (7) is used, other color components are corrected in the same manner as in formula (6), and therefore, color correction which is more exact than the conventional technique represented by the formula (2), can be effected. In the case that the formula (7) is applied, if the hue of black does not satisfactorily result, a black ink may also be used in accordance with the formula (5) so as to provide satisfactory black hue. When the circuit arrangement of FIG. 7 is employed for actualizing the above formula (7), only six input circuits are necessary since the black hue signal Bk is not used.

Figure 8:
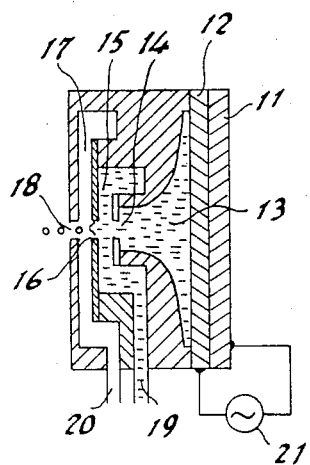
FIG. 8 is a schematic cross-sectional side view of an ink-jet print head which may be used in an ink-jet color reproducing system to which the present invention may be adapted.

The present invention will be further described in connection with an ink-jet color reproducing system to which the above-described formula (4), (6) or (7) is applied. FIG. 8 illustrates a print head for use with an ink-jet system. This print head per se is known from Japanese Patent Provisional Publication No. 51-37541, and belongs to a group called ink-on-demand type. The print head or nozzle structure comprises an inner ink chamber 13 and an outer ink chamber 15 communicating with each other through a coupling passage 14. An electrical-mechanical transducer 11, such as a piezo element having a metallic diaphragm 12 thereon is provided to one side of the inner ink chamber 13. The outer ink chamber 15 is supplied with ink via an ink supply conduit 19 from an unshown ink source. The outer ink chamber 15 communicates with an ink nozzle 16 facing an air nozzle 18. This air nozzle 18 is used so that air flowing from an unshown air pump via an air passage 20 jets therefrom continuously. When a driving signal voltage 21 is applied to the transducer 11, ink drops come out from the ink nozzle 16, and these ink drops are accelerated by the airflow jetting from the air nozzle 18. As a result, the ink drops are made into a mist to reach a print sheet (not shown). The amount of ink coming out of the ink chamber is controlled by varying the signal voltage 21. In detail, the diameter of the ink drops is controlled by the signal voltage 21, and therefore, the amount of ink is adjusted. In other words, color density is controlled by the signal voltage 21.

According to exmperiments, when the signal voltage 21 is changed from 90 volts to 250 volts (both expressed in terms of peak-to-peak voltage), printing or reproduction is effected within a range of 0.2 to 1.0 in terms of an optical density. Four ink-jet print heads are provided so that three primary color inks and a black ink are respectively applied thereto. Then driving signals, whose voltages are proportional to the values $Y_0$, $M_0$ and $C_0$ of formula (4) or (6) and to the value Bk of formula (5), are applied to the transducers respectively to effect color reproduction. As a result, a color picture of high-fidelity is satisfactorily reproduced in either case of formula (4) or (6).

Since ink-jet printing per a sheet of paper is completed within a short period time such as one or two minutes, a reproduced picture can be visually ascertained so as to adjust the aforementioned correction factors $\alpha_1$ to $\alpha_7$, $\beta_1$ to $\beta_7$.... Namely, the resistances of the variable resistors R1 to R7 of FIGS. 5, 6 or 7 may be manually adjusted so as to change each driving voltage. For this reason when the present invention is adapted to an ink-jet color reproducing system, color adjustment is readily and simply effected within a short period of time so as to achieve desirable and accurate color reproduction.

The above-described embodiments are just examples of the present invention, and therefore, it will be apparent for those skilled in the art that many modifications and variations may be made without departing from the spirit of the present invention.

What is claimed is:

1. A method of producing color picture signals $Y_0$, $M_0$, and $C_0$ for color reproductioin, in response to input signals indicative of three primary color components, comprising the steps of:

(a) processing said input signals for producing the following hue signals Bk, "r", "g", "b", "y", "m", "c" which are given by Bk = Min(Yi, Mi, Ci)
    r = Min(Yi, Mi) − Bk
    g = Min(Yi, Ci) − Bk
    b = Min(Ci, Mi) − Bk
    y = Yi − g − r − Bk
    m = Mi − r − b − Bk
    c = Ci − b − g − Bk wherein Min represents a function which assumes the smallest value among the values listed in the following parentheses;

(b) modifying said hue signals Bk, "r", "g", "b", "y", "m", "c" by correction factors $\alpha_1$ to $\alpha_7$, $\beta_1$ to $\beta_7$, and $\gamma_1$ to $\gamma_7$ as follows for producing said color picture signals each of which represents the amount of each primary color ink to be used in an additive process;

$$\begin{pmatrix} Y_0 \\ M_0 \\ C_0 \end{pmatrix} = \begin{pmatrix} \alpha_1 & \alpha_2 & \alpha_3 & \alpha_4 & \alpha_5 & \alpha_6 & \alpha_7 \\ \beta_1 & \beta_2 & \beta_3 & \beta_4 & \beta_5 & \beta_6 & \beta_7 \\ \gamma_1 & \gamma_2 & \gamma_3 & \gamma_4 & \gamma_5 & \gamma_6 & \gamma_7 \end{pmatrix} \begin{bmatrix} y \\ m \\ c \\ r \\ g \\ b \\ Bk \end{bmatrix}.$$

2. A method as claimed in claim 1, further comprising the step of producing a color picture signal $Bk_0$ with which the amount of a black ink will be controlled, said color picture signal $Bk_0$ being produced by modifying said hue signals Bk, "r", "g", "b", "y", "m", "c" in accordance with the following formula:

$$Bk_0 = \delta_1 y + \delta_2 m + \delta_3 c + \delta_4 r + \delta_4 r + \delta_5 g + \delta_6 b + \delta_7 Bk$$

wherein $\delta_1$ through $\delta_7$ are correction factors for respective hues "y", "m", "c", "r", "g", "b" and Bk.

3. A method as claimed in claim 1, further comprising the step of producing three driving signals by using said color picture signals so as to drive at least three ink-jet print heads through which said primary color inks are respectively applied to a print sheet.

4. A method of producing color picture signals $Y_0$, $M_0$, and $C_0$ for color reproduction, in response to input signals indicative of three primary color components, comprising the steps of:

(a) processing said input signals for producing the following hue signals Bk, "r", "g", "b", "y", "m", "c" which are given by Bk = Min (Yi, Mi, Ci)
r = Min (Yi, Mi) − Bk
g = Min (YI, Ci) − Bk
b = Min (Ci, Mi) − Bk
y = Yi − g − r − Bk
m = M − r − b − Bk
c = Ci − b − g − Bk wherein Min represents a function which assumes the smallest value among the values listed in the following parentheses;

(b) modifying said input signals Yi, Mi and Ci by said hue signals Bk, "r", "g", "b", "y", "m", "c" and also by correction factors $\alpha'_1$ to $\alpha'_7$, $\beta'_1$ to $\beta'_7$, and $\gamma'_1$ to $\gamma'_7$ as follows for producing said color picture signals each of which represents the amount of each primary color ink to be used in an additive process;

$$\begin{pmatrix} Y_0 \\ M_0 \\ C_0 \end{pmatrix} = \begin{pmatrix} Yi\ \alpha'_1\ \alpha'_2\ \alpha'_3\ \alpha'_4\ \alpha'_5\ \alpha'_6\ \alpha'_7 \\ Mi\ \beta'_1\ \beta'_2\ \beta'_3\ \beta'_4\ \beta'_5\ \beta'_6\ \beta'_7 \\ Ci\ \gamma'_1\ \gamma'_2\ \gamma'_3\ \gamma'_4\ \gamma'_5\ \gamma'_6\ \gamma'_7 \end{pmatrix} \begin{pmatrix} l \\ y \\ m \\ c \\ r \\ g \\ b \\ Bk \end{pmatrix}$$

5. A method as claimed in claim 4, further comprising the step of producing a color picture signal $Bk_0$ with which the amount of a black ink will be controlled, said color picture signal $Bk_0$ being produced by modifying said hue signals Bk, "r", "g", "b", "y", "m", "c" in accordance with the following formula:

$$Bk_0 = \delta_1 y + \oplus_2 m + \delta_3 c + \delta_4 r + \delta_5 g + \delta_6 b + \delta_7 Bk$$

wherein $\delta_1$ through $\delta_7$ are color correction factors for respective hues "y", "m", "c", "r", "g", "b" and Bk.

6. A method as claimed in claim 4, further comprising the step of producing three driving signals by using said color picture signals so as to drive at least three ink-jet print heads through which said primary color inks are respectively applied to a print sheet.

7. A method of producing color picture signals $Y_0$, $M_0$, and $C_0$ for color reproduction, in response to input signals indicative of three primary color components, comprising the steps of:

(a) processing said input signals for producing the following hue signals Bk, "r", "g", "b", "y", "m", "c" which are given by Bk = Min (Yi, Mi, Ci)
r = Min (Yi, Mi) − Bk
g = Min (Yi, Ci) − Bk
b = Min (Ci, Mi) − Bk
y = Yi − g − r − Bk
m = Mi − r − b − Bk
c = Ci − b − g − Bk wherein Min represents a function which assumes the smallest value among the values listed in the following parentheses;

(b) modifying said input signals Yi, Mi and Ci by said hue signals "r", "g", "b", "y", "m", "c" and also by correction factors $\alpha'_1$ to $\alpha'_6$, $\beta'_1$ to $\beta'_6$, and $\gamma'_1$ to $\gamma'_6$ as follows for producing said color picture signals each of which represents the amount of each primary color ink to be used in an additive process;

$$\begin{pmatrix} Y_0 \\ M_0 \\ C_0 \end{pmatrix} = \begin{pmatrix} Yi\ \alpha'_1\ \alpha'_2\ \alpha'_3\ \alpha'_4\ \alpha'_5\ \alpha'_6 \\ Mi\ \beta'_1\ \beta'_2\ \beta'_3\ \beta'_4\ \beta'_5\ \beta'_6 \\ Ci\ \gamma'_1\ \gamma'_2\ \gamma'_3\ \gamma'_4\ \gamma'_5\ \gamma'_6 \end{pmatrix} \begin{pmatrix} l \\ y \\ m \\ c \\ r \\ g \\ b \end{pmatrix}$$

8. A method as claimed in claim 7, further comprising the step of producing a color picture signal $Bk_0$ with which the amount of a black ink will be controlled, said color picture signal $Bk_0$ being produced by modifying said hue signals Bk, "r", "g", "b", "y", "m", "c" in accordance with the following formula:

$$Bk_0 = \delta_1 y + \delta_2 m + \delta_3 c + \delta_4 r + \delta_5 g + \delta_6 b + \delta_7 Bk$$

wherein $\delta_1$ through $\delta_7$ are color correction factors for respective hues "y", "m", "c", "r", "g", "b" and Bk.

9. A method as claimed in claim 7, further comprising the step of producing three driving signals by using said color picture signals so as to drive at least three ink-jet print heads through which said primary color inks are respectively applied to a print sheet.

10. A circuit arrangement for producing color picture signals $Y_0$, $M_0$, and $C_0$ for color reproduction, in response to input signals indicative of three primary color components, said circuit arrangement comprising:

(a) first means for processing said input signals so as to produce the following hue signals Bk, "r", "g", "b", "y", "m", "c" which are given by Bk = Min (Yi, Mi, Ci)
r = Min (Yi, Mi) − Bk
g = Min (Yi, Ci) − Bk
b = Min (Ci, Mi) − Bk
y = Yi − g − r − Bk
m = Mi − r − b − Bk
c = Ci − b − g − Bk wherein Min represents a function which assumes the smallest value among the values listed in the following parentheses;

(b) second means for selecting correction factors $\alpha_1$ to $\alpha_7$, $\beta_1$ to $\beta_7$, and $\gamma_1$ to $\gamma_7$ and (c) third means for modifying said hue signals Bk, "r", "g", "b", "y", "m", "c" by said correction factors $\alpha_1$ to $\alpha_7$, $\beta_1$ to $\beta_7$, and $\gamma_1$ to $\gamma_7$ as follows so as to produce said color picture signals each of which represents the amount of each primary color ink to be used in an additive process;

$$\begin{pmatrix} Y_0 \\ M_0 \\ C_0 \end{pmatrix} = \begin{pmatrix} \alpha_1 & \alpha_2 & \alpha_3 & \alpha_4 & \alpha_5 & \alpha_6 & \alpha_7 \\ \beta_1 & \beta_2 & \beta_3 & \beta_4 & \beta_5 & \beta_6 & \beta_7 \\ \gamma_1 & \gamma_2 & \gamma_3 & \gamma_4 & \gamma_5 & \gamma_6 & \gamma_7 \end{pmatrix} \begin{bmatrix} y \\ m \\ c \\ r \\ g \\ b \\ Bk \end{bmatrix}$$

11. A circuit arrangement as claimed in claim 10, further comprising:
   (a) fourth means for selecting another correction factors $\delta_1$ to $\delta_7$ for respective hues "y", "m", "c", "r", "g", "b" and Bk; and
   (b) fifth means for producing another color picture signal $Bk_0$ with which the amount of a black ink will be controlled, said color picture signal $Bk_0$ being produced by modifying said hue signals Bk, "r", "g", "b", "y", "m", "c" in accordance with the following formula:

$$Bk_0 = \delta_1 y + \delta_2 m + \delta_3 c + \delta_4 r + \delta_5 g + \delta_6 b + \delta_7 Bk.$$

12. A circuit arrangement as claimed in claim 10, wherein said first means comprises a first selector for producing said hue signal Bk, a combination of a second selector and a first adder for producing said hue signal "r", a combination of a third selector and a second adder for producing said hue signal "g", a combination of a fourth selector and a third adder for producing said hue signal "b", and fourth to sixth adders for producing said hue signals "y", "m", and "c".

13. A circuit arrangement as claimed in claim 10, wherein said second means comprises seven variable resistors respectively responsive to said signals Bk, "r", "g", "b", "y", "m", "c".

14. A circuit arrangement as claimed in claim 10, wherein said third means comprises three adders each provided for each of said color picture signals $Y_0$, $M_0$ and $C_0$.

15. A circuit arrangement as claimed in claim 14, wherein said each of said adders comprises seven input circuits each responsive to each of said hue signals, and an operational amplifier responsive to output signals from said input circuits, at least one of said input circuits having an operational amplifier, a variable resistor connected between an input terminal and an output terminal of the operational amplifier, an inverter responsive to an output signal from said operational amplifier, a switch for selecting the output signal from said operational amplifier or an output signal from said inverter.

16. A circuit arrangement for producing color picture signals $Y_0$, $M_0$, and $C_0$ for color reproduction, in response to input signals indicative of three primary color components, said circuit arrangement comprising:
   (a) first means for processing said input signals so as to produce the following hue signals Bk, "r", "g", "b", "y", "m", "c" which are given by
   Bk = Min (Yi, Mi, Ci)
   r = Min (Yi, Mi) − Bk
   g = Min (Yi, Ci) − Bk
   b = Min (Ci, Mi) − Bk
   y = Yi − g − r − Bk
   m = Mi − r − b − Bk
   c = Ci − b − g − Bk wherein Min represents a function which assumes the smallest value among the values listed in the following parentheses;
   (b) second means for selecting correction factors $\alpha'_1$ to $\alpha'_7$, $\beta'_1$ to $\beta'_7$, and $\gamma'_1$ to $\gamma'_7$ and
   (c) third means for modifying said input signals Yi, Mi and Ci by said hue signals Bk, "r", "g", "b", "y", "m", "c" and also by said correction factors $\alpha'_1$ to $\alpha'_7$, $\beta'_1$ to $\beta'_7$, and $\gamma'_1$ to $\gamma'_7$ as follows so as to produce said color picture signals each of which represents the amount of each primary color ink to be used in an additive process;

$$\begin{pmatrix} Y_0 \\ M_0 \\ C_0 \end{pmatrix} = \begin{pmatrix} Yi\, \alpha'_1\, \alpha'_2\, \alpha'_3\, \alpha'_4\, \alpha'_5\, \alpha'_6\, \alpha'_7 \\ Mi\, \beta'_1\, \beta'_2\, \beta'_3\, \beta'_4\, \beta'_5\, \beta'_6\, \beta'_7 \\ Ci\, \gamma'_1\, \gamma'_2\, \gamma'_3\, \gamma'_4\, \gamma'_5\, \gamma'_6\, \gamma'_7 \end{pmatrix} \begin{pmatrix} 1 \\ y \\ m \\ c \\ r \\ g \\ b \\ Bk \end{pmatrix}$$

17. A circuit arrangement as claimed in claim 16, further comprising:
   (a) fourth means for selecting another correction factors $\delta_1$ to $\delta_7$ for respective hues "y", "m", "c", "r", "g", "b" and Bk; and
   (b) fifth means for producing another color picture signal $Bk_0$ with which the amount of a black ink will be controlled, said color picture signal $Bk_0$ being produced by modifying said hue signals Bk, "r", "g", "b", "y", "m", "c" in accordance with the following formula:

$$Bk_0 = \delta_1 y + \delta_2 m + \delta_3 c + \delta_4 r + \delta_5 g + \delta_6 b + \delta_7 Bk.$$

18. A circuit arrangement as claimed in claim 16, wherein said first means comprises a first selector for producing said hue signal Bk, a combination of a second selector and a first adder for producing said hue signal "r", a combination of a third selector and a second adder for producing said hue signal "g", a combination of a fourth selector and a third adder for producing said hue signal "b", and fourth to sixth adders for producing said hue signals "y", "m", and "c".

19. A circuit arrangement as claimed in claim 16, wherein said second means comprises seven variable resistors respectively responsive to said signals Bk, "r", "g", "b", "y", "m", "c".

20. A circuit arrangement as claimed in claim 16, wherein said third means comprises three adders each provided for each of said color picture signals $Y_0$, $M_0$ and $C_0$.

21. A circuit arrangement as claimed in claim 20, wherein said each of said adders comprises seven input circuits each responsive to each of said hue signals, and an operational amplifier responsive to output signals from said input circuits, at least one of said input circuits having an operational amplifier, a variable resistor connected between an input terminal and an output terminal of the operational amplifier, an inverter responsive to an output signal from said operational amplifier, a switch for selecting the output signal from said operational amplifier or an output signal from said inverter.

22. A circuit arrangement for producing color picture signals $Y_0$, $M_0$, and $C_0$ for color reproduction, in response to input signals indicative of three primary color components, said circuit arrangement comprising:

(a) first means for processing said input signals so as to produce the following hue signals Bk, "r", "g", "b", "y", "m", "c" which are given by Bk=Min (Yi, Mi, Ci)
r=Min (Yi, Mi)−Bk
g=Min (Yi, Ci)−Bk
b=Min (Ci, Mi)−Bk
y=Yi−g−r−Bk
m=Mi−r−b−Bk
c=Ci−b−g−Bk wherein Min represents a function which assumes the smallest value among the values listed in the following parentheses;
(b) second means for selecting correction factors $\alpha'_1$ to $\alpha'_6$, $\beta'_1$ to $\beta'_6$, and $\gamma'_1$ to $\gamma'_6$ and
(c) third means for modifying said input signals Yi, Mi and Ci by said hue signals Bk, "r", "g", "b", "y", "m", "c" and also by said correction factors $\alpha'_1$ to $\alpha'_6$, $\beta'_1$ to $\beta'_6$, and $\gamma'_1$ to $\gamma'_6$ as follows so as to produce said color picture signals each of which represents the amount of each primary color ink to be used in an additive process;

$$\begin{pmatrix} Y_0 \\ M_0 \\ C_0 \end{pmatrix} = \begin{pmatrix} Yi\ \alpha'_1\ \alpha'_2\ \alpha'_3\ \alpha'_4\ \alpha'_5\ \alpha'_6 \\ Mi\ \beta'_1\ \beta'_2\ \beta'_3\ \beta'_4\ \beta'_5\ \beta'_6 \\ Ci\ \gamma'_1\ \gamma'_2\ \gamma'_3\ \gamma'_4\ \gamma'_5\ \gamma'_6 \end{pmatrix} \begin{pmatrix} l \\ y \\ m \\ c \\ r \\ g \\ b \end{pmatrix}.$$

23. A circuit arrangement as claimed in claim 22, further comprising:
(a) fourth means for selecting another correction factors $\delta_1$ to $\delta_7$ for respective hues "y", "m", "c", "r", "g", "b" and Bk; and
(b) fifth means for producing another color picture signal $Bk_0$ with which the amount of a black ink will be controlled, said color picture signal $Bk_0$ being produced by modifying said hue signals Bk, "r", "g", "b", "y", "m", "c" in accordance with the following formula:

$$Bk_0 = \delta_1 y + \delta_2 m + \delta_3 c + \delta_4 r + \delta_5 g + \delta_6 b + \delta_7 Bk.$$

24. A circuit arrangement as claimed in claim 22, wherein said first means comprises a first selector for producing said hue signal Bk, a combination of a second selector and a first adder for producing said hue signal "r", a combination of a third selector and a second adder for producing said hue signal "g", a combination of a fourth selector and a third adder for producing said hue signal "b", and fourth to sixth adders for producing said hue signals "y", "m", and "c".

25. A circuit arrangement as claimed in claim 22, wherein said second means comprises six variable resistors respectively responsive to said signals "r", "g", "b", "y", "m", "c".

26. A circuit arrangement as claimed in claim 22, wherein said third means comprises three adders each provided for each of said color picture signals $Y_0$, $M_0$ and $C_0$.

27. A circuit arrangement as claimed in claim 26, wherein said each of said adders comprises six input circuits each responsive to each of said hue signals, and an operational amplifier responsive to output signals from said input circuits, at least one of said input circuits having an operational amplifier, a variable resistor connected between an input terminal and an output terminal of the operational amplifier, an inverter responsive to an output signal from said operational amplifier, a switch for selecting the output signal from said operational amplifier or an output signal from said inverter.

* * * * *